Oct. 27, 1931.  R. E. KENNEDY  1,828,807
COMPASS COURSE AND GROUND SPEED INDICATOR
Filed Jan. 29, 1930  2 Sheets-Sheet 1

Inventor
Robert E. Kennedy,
By Clarence A. O'Brien
Attorney

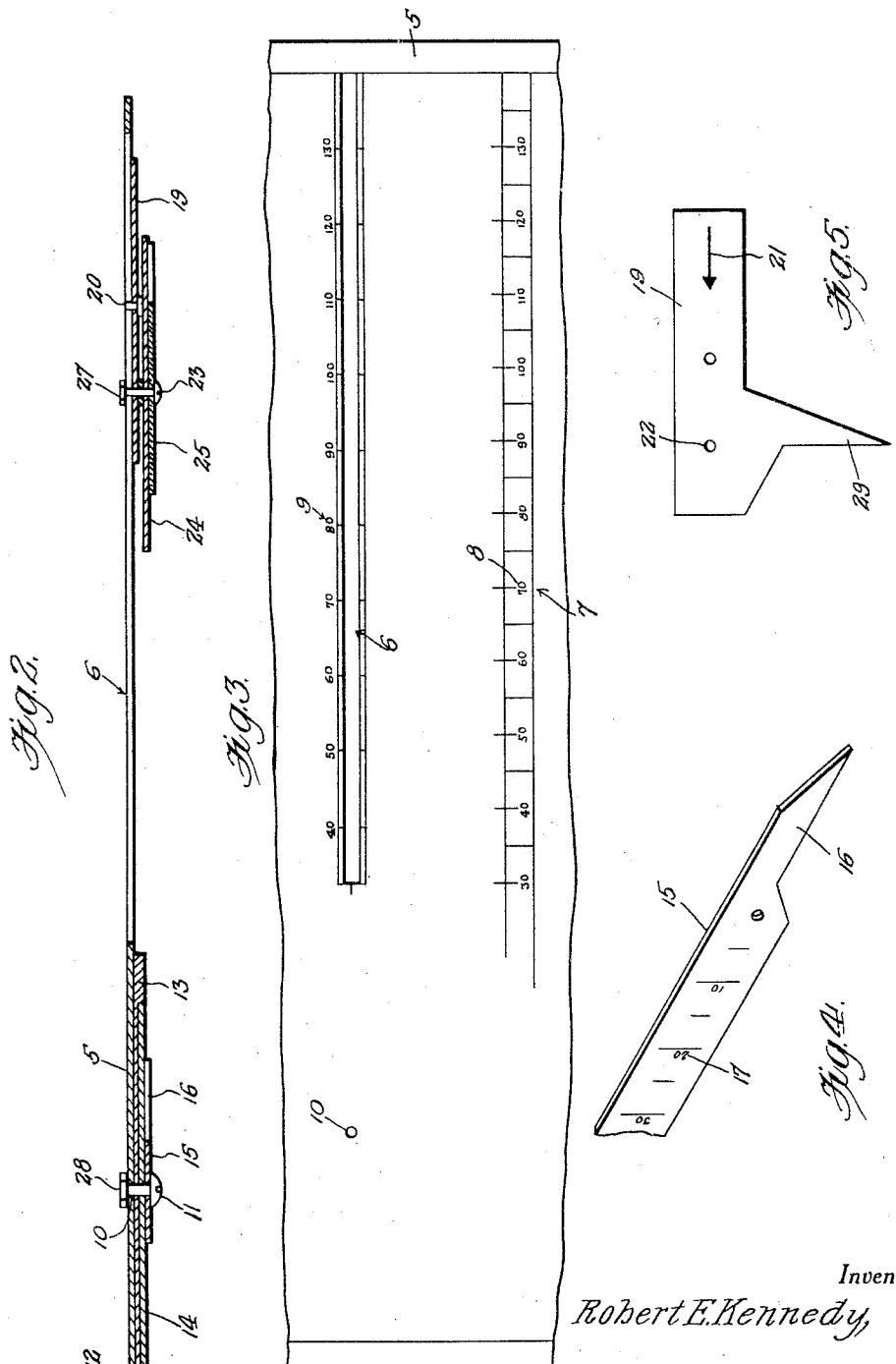

Patented Oct. 27, 1931

1,828,807

UNITED STATES PATENT OFFICE

ROBERT E. KENNEDY, OF LOS ANGELES, CALIFORNIA

COMPASS COURSE AND GROUND SPEED INDICATOR

Application filed January 29, 1930. Serial No. 424,326.

This invention relates to devices by means of which a pilot of an air craft having knowledge of the constant direction and speed of the wind, the speed of the aircraft, and further the degrees of his course between two certain points or towns he is to fly as figured on any map, is then enabled to accurately determine the compass course he should fly to arrive at his destination, in the least possible time, and whereby further the pilot may also accurately determine the true airspeed which will then enable the pilot to make an accurate check of the time as will be required for reaching the destination.

A still further object of the invention is to provide a device of the character above mentioned, which, when the pilot has previous knowledge of the map course over which he is to fly, the compass variation at a given point, together with the speed of the aircraft per hour, enables him to accurately determine the wind direction and velocity.

A still further object of the invention is to provide a device of the character above mentioned, which is simple in construction, is simple in its structure and operation, so that the device can be readily used by a novice without requiring extensive training in mathematics, and whereby even the student pilot will be able to determine the above mentioned problem, and further, to provide such a device wherein the above-mentioned problem may be quickly and accurately determined, even by the beginner.

Other objects and advantages of the invention will become apparent during a study of the following description, taken in connection with the accompanying drawings, wherein:

Figure 2 is a longitudinal sectional view taken therethrough on substantially a horizontal plane.

Figure 3 is a fragmentary detail elevational view for more clearly showing the compass course scale and the ground speed scale forming part of the invention.

Figure 4 is a fragmentary elevational view of the pointer end of the wind scale.

Figure 5 is a plan view of the combined slide and pointer to be hereinafter referred to more in detail.

Figure 1:
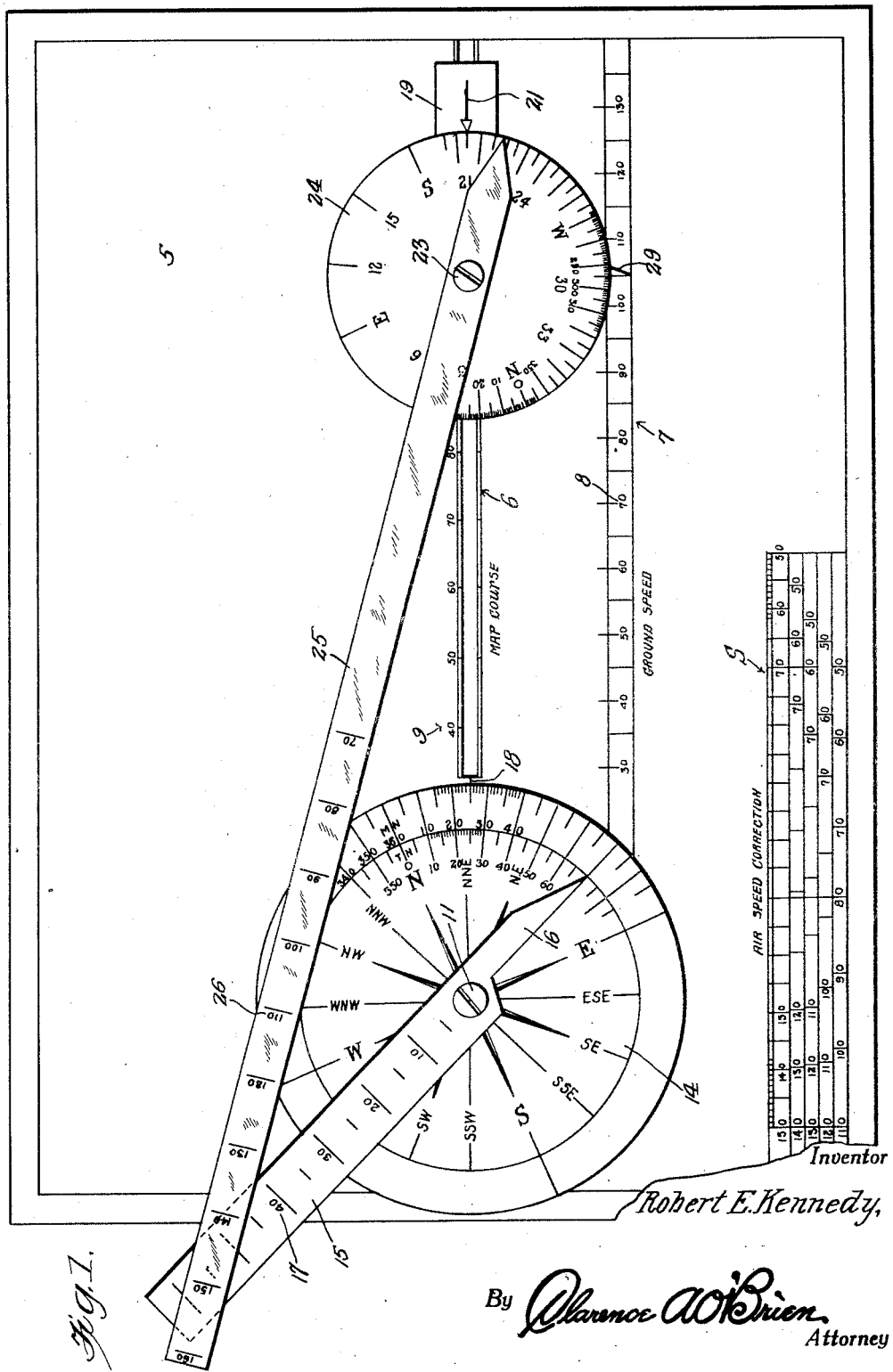
Figure 1 is a top plan view of the invention.

With reference more in detail to the drawings, it will be seen that my improved device comprises a relatively large rectangular plate 5 which is provided intermediate its longitudinal edges with a compass course scale designated generally by the reference character 6, which compass course scale extends inwardly from one transverse end edge of the plate 5, and at its inner end terminates inwardly in spaced relation to the other transverse end of said plate, as shown to advantage in Figure 3.

Beneath the compass course scale 6 and in spaced parallelism thereto, there is formed a ground speed scale designated generally by the reference character 7, which ground speed scale 7 likewise extends longitudinally of the plate 5 inwardly from the first mentioned end of the plate and at its inner end terminates slightly beyond the inner end of the compass course scale 6, as also shown to advantage in Figure 3.

The ground speed scale 7 may be painted or otherwise formed on the plate 5 and embodies suitable graduations 8 indicative of the ground speed of the aircraft. The map course scale 6 is in the nature of an elongated slot having graduations 9 on one edge thereof, which graduations 9 designate degrees as would be noted on any map.

In spaced relation to the inner end of the slot of the map course scale 6, the plate 5 is provided with an opening 10, said slot 10 being arranged in alinement with the longitudinal medium of the slot, and a headed bolt 11 extends through the slot, as shown to advantage in Figure 2. Mounted on the bolt 11 is a relatively large compass card 12 provided on its outer face at its circumferential edge, with a raised annular ring 13, which ring 13 is provided with the usual compass graduations ranging from zero to three hundred and sixty (360) degrees, constituting the true magnetic north readings of the compass as designated by MN printed or otherwise formed on the ring at the point marked 360 degrees.

Also mounted on the bolt 11 and fitting against the base of the compass card 12 concentrically of the ring 13 is an inner compass card 14, which inner compass card has the usual compass points, together with the usual scale of degrees arranged around said card, so that corresponding bearings on the compass card 14 and ring 13 may be disposed opposite on each, the bearings on the compass card 14 being indicative of the true north readings as indicated by the letters TN, at the zero point corresponding to the point marked 360 degrees on the ring 13, as shown to advantage in Figure 1.

Likewise mounted on the pintle or bolt 11 is a wind arm designated generally by the reference character 15. This wind arm 15 at one end thereof merges into, or has formed integrally therewith, a pointer 16, which can be read against the direction indicia of the compass card 14 as will be hereinafter more evident. It is to be noted, that the wind arm 15 is mounted on the bolt 11 adjacent the pointer 16, and said arm 15 on its outer or front face is provided with a scale or graduation 17 for indicating the known velocity of the wind.

At its inner end, the map course scale 6 further embodies a pointer 18, printed or otherwise formed on the plate 5 in alinement with the longitudinal median of the slot of said map course scale, and against which the inner and outer compass cards 13 and 14 may be read.

Movable longitudinally of the slot is an elongated pointer carrying slide plate 19. The slide plate 19 intermediate its ends and inwardly from its longitudinal edges is provided with a guide pin 20 workable in the slot, and that end of said slide plate 19 farthest remote from the pointer 18 has formed thereon in any desired manner a stationary map course pointer 21. Inwardly from the opposite end, the slide plate 19 is provided with an aperture 22 through which extends a headed bolt 23, which bolt 23 also extends through the slot as shown to advantage in Figure 2.

Rotatable on the bolt 22 is a compass card 23, which compass card 23 is provided with the usual compass points and has the usual scale of degrees arranged thereon and extending therearound. The compass card 23 is indicative of the readings of the magnetic compass by which the pilot of the aircraft flies. The graduations on the compass card 23 are to be read against the map course pointer 21.

A relatively long narrow air speed arm 25 is mounted inwardly from one end thereof on the bolt 23 for movement across the face of the compass card 24 and against which the graduations on said compass card 24 may be read. Also formed in any suitable manner, on the air speed arm 25 beginning from a point intermediate the ends thereof toward the opposite end is a scale or graduation 26, indicative of the air speed of the aircraft.

Screw threaded on that end of the bolt 23 which extends beyond the rear or under face of the plate 5 is a nut 27, and likewise a nut 28 is threaded on that end of the bolt 11 which also extends beyond the last mentioned face of said plate 5, all of which is shown to advantage in Figure 2.

The slide plate 19 inwardly from that end nearest the pointer 18 has formed integrally therewith a lateral pointer 29 movable over the ground speed scale 7 as shown to advantage in Figure 1, and against which pointer 29 the graduations 8 may be read.

It is to be noted that the scales or graduations on the wind arm 15, air speed arm 25, and the ground speed scale 7 have their divisions equal. It is also to be noted, that preferably the air speed arm 25 is formed of a transparent material such as celluloid and the like.

A knowledge of the manner in which the device is to be used may be gleaned from the following:

Let it be presumed, that the number of degrees between two certain towns that the pilot of the aircraft is to fly is known to the pilot as having been figured on any map. It is also to be presumed that the pilot has full knowledge of the direction and velocity of the wind. With this knowledge at hand, in addition to the known plane speed or speed of the aircraft, together with the compass variation at a given point, the pilot is desirous to ascertain the compass course to fly by and the ground speed or speed of the aircraft over the given course.

First of all, the inner compass 14 is rotated so that the graduations of its scale corresponding to the known compass variation, registers with the graduation 360 degrees for MN as designated on the outer compass 13; next, the inner and outer compasses 14 and 13 respectively are simultaneously rotated until the graduation on the inner compass 14 corresponding to the known graduation indicative on a map scale of the number of degrees or distance between the two towns or points that the pilot is to fly, which distance constitutes the course of the aircraft, registers with the pointer 18 at the inner end of the map course scale 6. After which, the wind arm 15 is then rotated until its pointed end 16 registers with the indicia on the inner compass card 14 corresponding to the known direction of the wind.

Now, the air speed arm 25, is moved so that that graduation of its scale 26 corresponding to the air speed, which is the speed per hour of the aircraft, intersects the wind arm at that graduation of the scale 17 on said wind arm indicative of the known wind velocity per hour. Next, the compass card 24 is rotated until that graduation of its scale, corresponding to the graduation of the scale of the other compass card 13 which is now in registry with the pointer 18, is brought into registry with the map course arrow 21 on the slide 19.

The pointed end of air speed arm 25 now points or registers with the graduation or degree on the scale of the compass card 24 indicative of the compass course the pilot must now fly in reaching his destination to correct for wind.

Manifestly, the slide 19 has been moved longitudinally of the slot of map course scale 6, and consequently pointer 29 has been moved over ground speed scale 7. The graduation on scale 7 with which the pointer 29 now registers, less the known air speed, indicates the number of miles per hour the craft is blown by the wind, for example, if the known air speed was one hundred miles per hour, and the pointer 29 now registers with the graduation one hundred and five, as substantially shown in the drawings, the aircraft is blown five miles per hour by the wind.

From the foregoing, it will be seen then that the pilot of the aircraft is now fully cognizant of the course he must steer to correct for wind, and the ground speed or speed of plane over the given course. Having knowledge of the number of degrees of map course, the compass variation, and the plane speed, let it be presumed that the pilot wishes to find wind direction and velocity. First the pilot should fly over a known stretch of land on a given course, and over two objects that he knowns are a certain distance apart. He should then check the time required for travelling over the known distance between these two objects. In this manner the speed per hour of the aircraft is determined and also the direction of travel is determined from the compass with which the aircraft is equipped.

The inner compass 14 and outer compass 13 are simultaneously rotated until the graduations on the outer scale 13 equal the difference between the known degree of compass variation and the reading of the compass with which the air craft is equipped, is in registration with the pointer 18 and also the compass card 24 is rotated until that degree of its scale corresponding with the degree of the last referred to compass card 13 registers with the arrow 21.

The air speed arm 25 is then rotated until its pointed end points to or registers with that degree on the compass card 24 corresponding to the reading or degree noted on the compass with which the aircraft is equipped. The wind speed arm 15 is then rotated until it intersects air speed arm 25 at that degree on the scale 26 of said air speed arm indicative of the known speed of the aircraft, so that for example, if the known speed of the aircraft is one hundred miles per hour, the wind speed arm 15 is rotated until it intersects the air speed arm 25 at the graduation one hundred on the scale 26 of said air speed arm 25.

The pointer 16 of wind speed arm 15 will then aline or register with the direction indicia on inner compass card 14 to designate the direction in which the wind is blowing, while the graduations of the scale 17 of wind arm 15 that is coincident with the graduation one hundred of the scale on arm 25 is indicative of the wind velocity.

Thus from the foregoing, it will be seen that the pilot may readily determine, with the information above stated, and through the medium of this device, the direction and velocity of the wind.

It will also be appreciated that in the operation of my device the problems such as above outlined are all figured out by triangulation and that the use of such a device does not entail any great knowledge of mathematics, but will enable the pilot to determine the answers of such problems as above-outlined in a minimum amount of time.

Preferably in the lower left hand corner of the plate 5, there is printed or otherwise formed thereon, a scale designated generally by the reference character 5 which may be used for air speed correction at different altitudes. As is well known, the higher the aircraft is flown, the slower the indicator on the aircraft registers, for example, at fifteen thousand (15,000) feet, the indicator would show one hundred and twenty miles per hour, whereas in reality the air speed of the craft is really one hundred and fifty miles per hour.

It is thought that from the foregoing description, taken in connection with the accompanying drawings, a clear understanding of the operation, construction, utility and advantages of an instrument of this character will be had by those skilled in the art without a more detailed description.

Even though I have herein shown and described the preferred embodiment of my invention, it is to be understood that the same is susceptible to changes fully comprehended by the spirit of the invention as herein described, and the scope of the appended claims.

Having thus described the invention, what I wish to claim as new is:

1. In an instrument of the class described, a relatively flat base plate, a map course scale extending inwardly from one end of said plate, a member movable over said plate longitudinally of said scale, a ground speed scale on said plate extending inwardly from said one end of the plate in spaced parallelism to said first mentioned scale, a pointer carried by said movable member adapted to be read against the graduations of said ground speed scale, a compass card rotatable about a fixed axis on said movable member, an arrow on said movable member adapted to be read against the graduations on said compass card, a second compass card rotatably mounted on said plate in spaced relation to the inner end of the first mentioned scale and capable of turning about a fixed axis passing through the longitudinal axis of the first mentioned scale, a ring concentrically of said second compass card having graduations thereon corresponding to a compass degree scale mounted for rotation around the last referred to compass card, a wind arm mounted for rotation about the axis of said second compass card, and an air speed arm mounted for rotation about the axis of the compass card on said movable member.

2. In an instrument of the class described, a base having a map course scale and a slot extending therealong, a member movable over said scale and having a guide pin movable in said slot, a ground speed scale provided on said base, a pointer carried by said movable member adapted to be read against the graduations of said ground speed scale, a pivot carried by said movable member, a compass card mounted on the pivot, a fixed arrow on said movable member adapted to be read against the degree scale of said compass card, an air speed arm capable of rotation about the axis of said compass card, said air speed arm having one end thereof terminating in a pointer adapted to be read against the degree scale on said compass card, there being graduations on said air speed arm, a second compass card, a ring mounted for rotation about said second compass card and having a degree scale thereon, corresponding to the degree scale of a compass, said second compass card and ring mounted for rotation about a common axis passing through the longitudinal axis of the slot of said map scale, and a graduated wind arm capable of rotation about the axis of said second compass card and said ring for intersecting said air speed arm at predetermined points on said wind speed arm and air speed arm respectively.

3. In an instrument of the class described, a base having a map course scale and a slot extending therealong, a member movable over said scale and having a guide pin movable in said slot, a ground speed scale provided on said base, a pointer carried by said movable member adapted to be read against the graduations of said ground speed scale, a pivot carried by said movable member, a compass card mounted on the pivot, a fixed arrow on said movable member adapted to be read against the degree scale of said compass card, an air speed arm capable of rotation about the axis of said compass card, said air speed arm having one end thereof terminating in a pointer adapted to be read against the degree scale on said compass card, there being graduations on said air speed arm, a second compass card, a ring mounted for rotation about said second compass card and having a degree scale thereon, corresponding to the degree scale of a compass, said second compass card and ring mounted for rotation about a common axis passing through the longitudinal axis of the slot of said map scale, and a graduated wind arm capable of rotation about the axis of said second compass card and said ring for intersecting said air speed arm at predetermined points on said wind speed arm and air speed arm respectively, a fixed pointer at that end of said map course scale adjacent said second compass card and arranged in longitudinal alinement with the fixed arrow on said movable member and adapted to be read against the degree scale of said second compass card and ring respectively.

In testimony whereof I affix my signature.
ROBERT E. KENNEDY.